United States Patent [19]

Allen

[11] Patent Number: 4,784,513

[45] Date of Patent: Nov. 15, 1988

[54] TOOL WEDGE

[76] Inventor: Lewis E. Allen, P.O. Box 8026, Longview, Tex. 75607

[21] Appl. No.: 74,724

[22] Filed: Jul. 17, 1987

[51] Int. Cl.$^4$ ................................................ B25G 3/00
[52] U.S. Cl. ...................................... 403/248; 403/277
[58] Field of Search ............... 403/277, 248, 249, 250, 403/251, 409.1; 411/538

[56] References Cited

U.S. PATENT DOCUMENTS

| | | | |
|---|---|---|---|
| 364,238 | 6/1887 | Francis | 403/250 |
| 450,944 | 4/1891 | Landis | 403/277 |
| 905,069 | 11/1908 | Hair | 403/277 |
| 1,065,122 | 6/1913 | Frasher | 403/249 |
| 1,432,106 | 10/1922 | Haines | 403/249 |

FOREIGN PATENT DOCUMENTS 189990 12/1922 United Kingdom ............... 411/538

*Primary Examiner*—Andrew V. Kundrat
*Attorney, Agent, or Firm*—Norman B. Rainer

[57] ABSTRACT

An improved wedge is provided for securing the heads of striking tools such as hammers, axes and the like to the extremities of their elongated wooden handles. The wedge is of monolithic metal construction, having a downwardly directed edge or sufficient sharpness to penetrate wood, and having a centered aperture. When the wedge is driven into the handle, the wood grain expands into the aperture, thereby securing the wedge.

3 Claims, 1 Drawing Sheet

U.S. Patent  Nov. 15, 1988  4,784,513
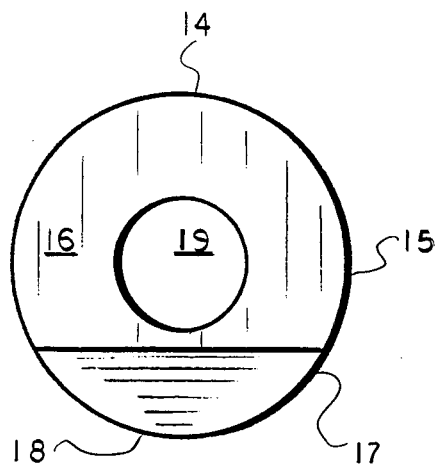
FIG.1
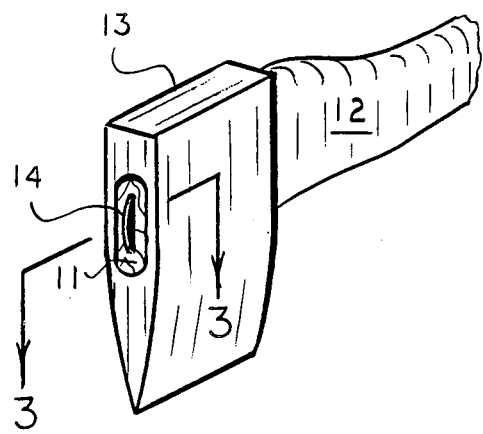
FIG.2
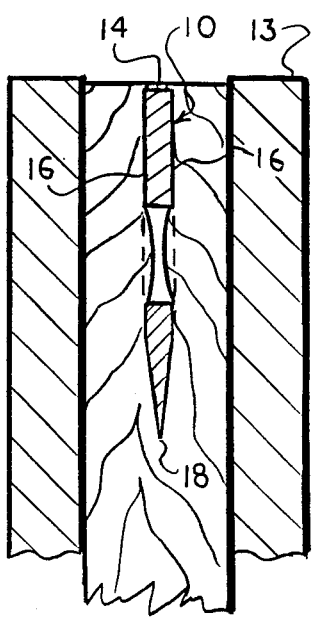
FIG.3
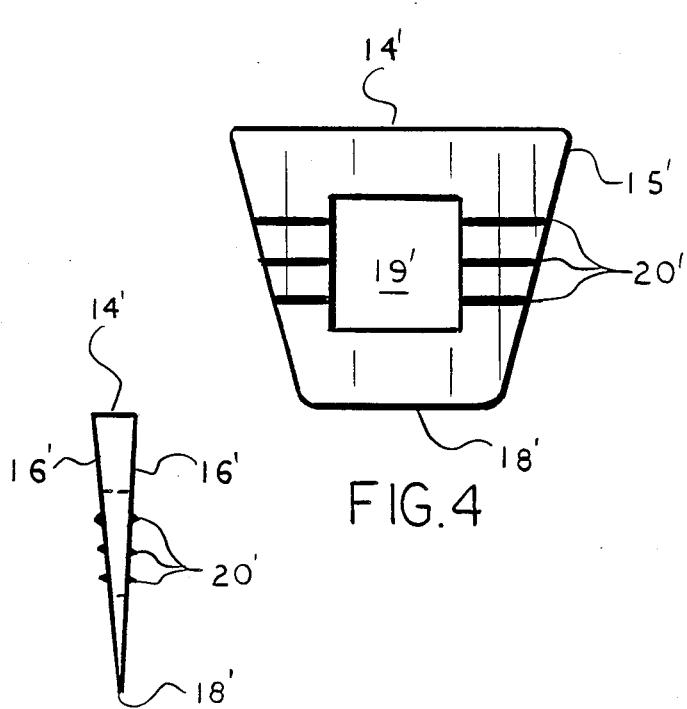
FIG.4
FIG.5

TOOL WEDGE

BACKGROUND OF THE INVENTION

This invention relates to a wedge for securing the heads of striking tools such as hammers, axes and the like to the extremities of their wooden handle shafts.

Various wedge devices have been employed to secure the heads of manually operated striking tools to the working extremity of a wooden handle. In general, such wedges are hammered into the end of the handle in an axial direction. Such action generates high laterally-directed pressure upon the wood, which causes strong frictional engagement with the tool head emplaced upon the extremity of the handle. In the course of time, however, the wood may shrink slightly due to drying and aging, thereby loosening the wood's grip upon the tool. The extensive vibrational stresses imparted to the tool head and handle in the course of extensive use also cause loosening of the frictional bond between the wood and tool head.

Modified wedge devices have earlier been disclosed for providing greater or more durable holding effect, but such devices have been either of expensive construction or difficult to install.

It is accordingly an object of the present invention to provide a wedge device for causing a tool head to be more durably held by a wooden handle.

It is another object of this invention to provide a wedge device as in the foregoing object which is easily installable into the working extremity of the wooden handle of a hand-operated striking tool.

It is a further object of the present invention to provide a wedge device of the aforesaid nature of rugged, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a wedge device of monolithic metal construction having:

(a) an upper extremity of sufficient thickness to resist deformation when hammered upon, (b) a lower extremity having a downwardly directed edge of sufficient sharpness to penetrate wood, (c) an outer perimeter, (d) opposed substantially flat boundary surfaces in spaced apart relationship defining the general thickness of the device, and (e) an aperture communicating between said boundary surfaces in substantially centered relationship with respect to said perimeter.

In preferred embodiments, the device is fabricated from an existing metal washer by grinding a portion to a tapered edge, the resultant wedge device thereby having a circular outer perimeter and circular aperture. In other embodiments however, the outer perimeter and aperture may have other, non-round configurations. The boundary surfaces may be made to contain recessed or upraised holding means of a directional nature intended to provide additional resistance to the removal of the wedge device from the wooden handle.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a plan view of an embodiment of the wedge device of the present invention.

FIG. 2 is a perspective view showing the embodiment of FIG. 1 in operative association with the working extremity of a wooden handle.

FIG. 3 is a sectional view taken on the line 3—3 of FIG. 2.

FIG. 4 is a plan view of an alternative embodiment of the wedge device of this invention.

FIG. 5 is a side view of the embodiment of FIG. 3.

DESCRIPTION OF THE PREFERRED EMBODIMENT

Referring to FIGS. 1-3, an embodiment of the wedge device 10 of this invention is shown emplaced within the working extremity 11 of wooden handle 12 carrying an axe head 13. Said emplacement is achieved by hammering upon the wedge device to drive it into the wooden handle.

The wedge device 10 is of monolithic construction, having been fabricated of a non-brittle iron or alloy thereof by a casting, machining, or stamping operation. The device has an upper extremity 14 of sufficient thickness to resist deformation when hammered upon in the installation step. Such thickness may range from about 1/16" to 5/16". The embodiment of the wedge device exemplified in FIGS. 1-3 is derived from a metal washer of standard circular outer perimeter 15 having a uniform thickness measured between flat boundary surfaces 16. In said embodiment, a region of the washer has been subjected to a grinding operation which defines a lower extremity 17 having a downwardly directed, doubly tapered edge 18 sufficiently sharp to penetrate wood. The region which has been ground to form tapered edge 18 may extend between 10% and 40% of the diameter of outer perimeter 15 of the washer.

A circular aperture 19 centered within perimeter 15 penetrates the washer, communicating with opposed boundary surfaces 16. In the case of wedge devices fabricated from washers, it has been found that the diameter of aperture 19 should be between 25% and 50% of the diameter of outer perimeter 15 in order to secure the advantages of the present invention.

Once the wedge device is emplaced in a wooden handle, splinters of wood extend into aperture 19, and such effect prevents loosening or removal of the wedge device.

In the alternative embodiment exemplified in FIGS. 4 and 5, outer perimeter 15' is of substantially rectangular configuration, as is aperture 19'. Tapered edge 18' is formed as a consequence of the tapered nature of opposed boundary surfaces 16'. Holding means in the form of upraised parallel ridges 20 are formed in boundary surfaces 16' in parallel orientation to edge 18'. The holding means may alternatively be recessed grooves. It has been found that such holding means, which further increase the force by which the wood engages the device, are preferably disposed in regions laterally adjacent the aperture.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention what is claimed is:

1. A wedge device of monolithic metal construction fabricated from an existing metal washer by grinding a portion to a tapered edge, the resulting wedge device having a circular outer perimeter and circular aperture, and
   an upper extremity of sufficient thickness to resist deformation when hammered upon,
   a lower extremity having a downwardly directed edge of sufficient sharpness to penetrate wood,
   opposed substantially flat boundary surfaces in spaced apart relationship defining the general thickness of the device, and
   said aperture communicating between said boundary surfaces in substantially centered relationship with respect to said perimeter.

2. The device of claim 1 wherein the portion ground to a tapered edge extends between 10% and 40% of the diameter of said outer perimeter.

3. The device of claim 2 wherein the diameter of said aperture is between 25% and 50% of the diameter of said outer perimeter.

* * * * *